United States Patent
Quievy (10) Patent No.: US 7,292,182 B2
(45) Date of Patent: Nov. 6, 2007

(54) METHOD OF CALIBRATING A MICROWAVE SOURCE

(75) Inventor: Didier Quievy, Massy (FR)

(73) Assignee: Thales, Neuilly sur Seine (FR)

( * ) Notice: Subject to any disclaimer, the term of this patent is extended or adjusted under 35 U.S.C. 154(b) by 103 days.

(21) Appl. No.: 10/538,057

(22) PCT Filed: Dec. 4, 2003

(86) PCT No.: PCT/EP03/50945

§ 371 (c)(1),
(2), (4) Date: Jun. 9, 2005

(87) PCT Pub. No.: WO2004/053517

PCT Pub. Date: Jun. 24, 2004

(65) Prior Publication Data

US 2006/0033655 A1    Feb. 16, 2006

(30) Foreign Application Priority Data

Dec. 10, 2002 (FR) .................................. 02 15839

(51) Int. Cl.
*G01S 7/40* (2006.01)
(52) U.S. Cl. .................... 342/174; 342/165; 342/170; 342/173; 342/174; 342/368
(58) Field of Classification Search ................ 342/170, 342/165–174, 403, 406, 374, 368, 377
See application file for complete search history.

(56) References Cited

U.S. PATENT DOCUMENTS

| | | | | |
|---|---|---|---|---|
| 3,967,279 A | * | 6/1976 | Zeger ........................ | 342/424 |
| 4,488,155 A | * | 12/1984 | Wu .......................... | 342/376 |
| 4,673,939 A | * | 6/1987 | Forrest ..................... | 342/174 |
| 4,714,873 A | * | 12/1987 | McPherson et al. ........ | 324/613 |
| 4,926,186 A | * | 5/1990 | Kelly et al. ................. | 342/360 |
| 5,027,125 A | * | 6/1991 | Tang ......................... | 342/368 |
| 5,180,985 A | * | 1/1993 | Zoccarato et al. .......... | 324/613 |
| 5,337,014 A | * | 8/1994 | Najle et al. ................. | 324/613 |

(Continued)

FOREIGN PATENT DOCUMENTS

| | | |
|---|---|---|
| EP | 0 367 167 | 5/1990 |
| EP | 0 762 541 | 3/1997 |

*Primary Examiner*—Thomas H. Tarcza
*Assistant Examiner*—Hien Ly
(74) *Attorney, Agent, or Firm*—Lowe Hauptman Ham & Berner, LLP (57) ABSTRACT

The present invention relates to a method for calibrating the phase of a microwave source, in which: a calibration circuit is closed, the calibration circuit comprising an injection channel connected to a measurement channel via the source to be calibrated; a test signal is injected through the source to be calibrated, the test signal being injected on the injection channel, the phase $\phi_m$ of the signal having passed through the source to be calibrated is measured, the phase of the signal being measured on the measurement channel, wherein: the amplitude $A_m$ of the signal having passed through the source to be calibrated is measured, the amplitude of the signal being measured on the measurement channel;

The calibration circuit is opened at the source to be calibrated; the test signal is injected on the injection channel; the phase $\phi_f$ and the amplitude $A_f$ of the signal present on the measurement channel is measured; a corrected phase value $\phi_c$ is determined, this corrected phase being the phase of a complex number $U_c$, calculated from two complex numbers $U_m$ and $U_f$, where: $U_m = A_m \cdot \exp(i \cdot \phi_m)$ $U_f = A_f \cdot \exp(i \cdot \phi_f)$.

8 Claims, 6 Drawing Sheets

U.S. PATENT DOCUMENTS

| | | | |
|---|---|---|---|
| 5,351,054 A * | 9/1994 | Fredericks et al. | 342/172 |
| 5,412,414 A * | 5/1995 | Ast et al. | 342/174 |
| 5,688,050 A * | 11/1997 | Sterzer et al. | 374/122 |
| 5,969,667 A * | 10/1999 | Farmer et al. | 342/165 |
| 6,104,492 A * | 8/2000 | Giles et al. | 356/454 |
| 6,127,966 A * | 10/2000 | Erhage | 342/174 |
| 6,147,501 A | 11/2000 | Chodora | |
| 6,339,399 B1 | 1/2002 | Ovesjoe | |
| 6,366,233 B1 * | 4/2002 | Oshida | 342/47 |
| 6,396,436 B1 * | 5/2002 | Lissel et al. | 342/70 |
| 6,421,624 B1 | 7/2002 | Wagata et al. | |
| 6,480,153 B1 * | 11/2002 | Jung et al. | 342/368 |
| 6,690,952 B2 * | 2/2004 | Nishimori et al. | 455/562.1 |
| 6,885,333 B2 * | 4/2005 | Sparrow et al. | 342/13 |
| 2002/0196178 A1 * | 12/2002 | Beard | 342/42 |
| 2004/0001020 A1 * | 1/2004 | Huettner et al. | 342/174 |
| 2006/0044182 A1 * | 3/2006 | Vacanti | 342/120 |

* cited by examiner

METHOD OF CALIBRATING A MICROWAVE SOURCE

CROSS-REFERENCE TO RELATED APPLICATIONS

The present Application is based on International Application No. PCT/EP2003/050945, filed on Nov. 4, 2003, which in turn corresponds to FR 02/15839 filed on Dec. 10, 2002, and priority is hereby claimed under 35 USC §119 based on these applications. Each of these applications are hereby incorporated by reference in their entirety into the present application.

BACKGROUND OF THE INVENTION

The present invention relates to a method for calibrating a microwave source. It can notably be applied to the phase calibration of the elementary sources of an array antenna.

An array antenna comprises an array of phase-controlled elementary sources, each source being connected to a radiating element. By controlling the phases of the elementary sources in a suitable manner, a plane wave can be created in a desired direction. An electronic sweep can thus be carried out, in other words the direction of the main lobe can be modified by controlling the phases of the various sources.

However, elementary sources can go out of adjustment, producing a different phase from the setpoint phase. These phase differences lead to limitations in the performance of the sweep. They can notably result in a reduction in gain of the antenna, a distortion of the main lobe, an increase in the level of the secondary lobes and a deviation of the electromagnetic axis.

A known solution is to carry out periodic calibrations of the phase of each elementary source. In order to perform a calibration of an elementary source:

a calibration circuit is closed, the calibration circuit comprising an injection channel connected to a measurement channel via the source to be calibrated;

a test signal is injected through the source to be calibrated, the test signal being injected on the injection channel, the phase $\phi_m$ of the signal having passed through the source to be calibrated is measured, the phase of the signal being measured on the measurement channel.

However, microwave interference exists that causes errors in the phase measurements of each elementary source.

SUMMARY OF THE INVENTION

One aim of the invention is to improve the calibration by correcting for the microwave interference coming from the imperfect electromagnetic isolation of the calibration circuit. For this purpose:

the amplitude $A_m$ of the signal having passed through the source is measured, the amplitude of the signal being measured on the measurement channel;

the calibration circuit is opened at the element to be calibrated;

the test signal is injected on the injection channel;

the phase $\phi_f$ and the amplitude $A_f$ of the signal present on the measurement channel is measured;

a corrected phase value $\phi_c$ is determined, this corrected phase being the phase of a complex number $U_c$, calculated from two complex numbers $U_m$ and $U_f$, where:

$$U_m = A_m \cdot \exp(i \cdot \phi_m)$$

$$U_f = A_f \cdot \exp(i \cdot \phi_f)$$

The calibration according to the invention has the advantage of being usable in array antennas, even when one of the sources (malfunctioning) will not deactivate. The invention allows a malfunctioning source to be tested and localized using the same measurement results.

BRIEF DESCRIPTION TO THE DRAWINGS

Other characteristics and advantages of the invention will become apparent upon reading the following detailed description, presented as a non-limiting illustration and with reference to the appended figures which show.

DETAILED DESCRIPTION

Figure 1:
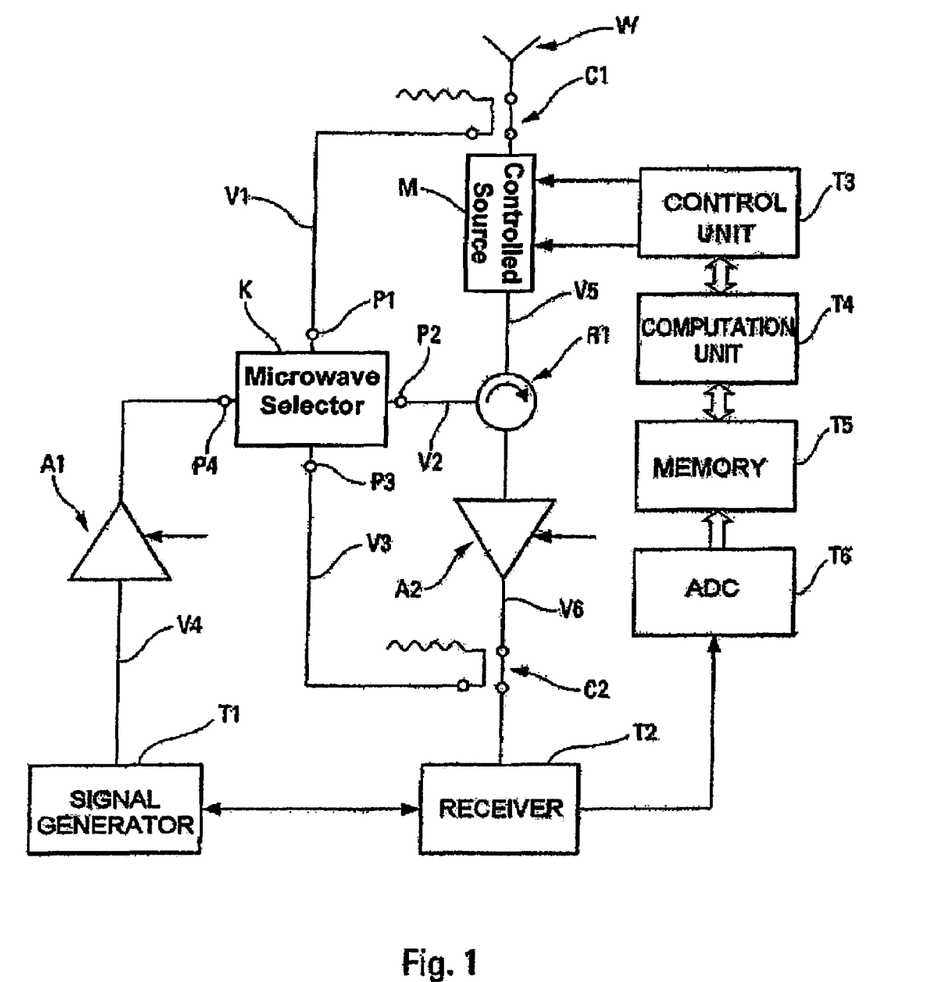
FIG. 1, an example of radar equipped with a calibration circuit.

Reference is now made to FIG. 1 in which an example of radar equipped with a calibration circuit is shown.

The radar can operate in transmission mode or in reception mode. When the radar operates in transmission mode, a signal generator T1 delivers microwave pulses. The microwave pulses propagate on a transmission channel V2, V4. They are then channeled by means of a circulator R1 toward a transmission and reception channel V5. The transmission and reception channel V5 comprises a controllable source M and a radiating element W. The microwave pulses are transmitted in the form of waves by the radiating element W.

When the radar operates in reception mode, the radiating element W receives microwaves. The radiating element W converts the waves into a microwave frequency signal that propagates on the transmission and reception channel V5. The signal is then channeled by means of the circulator R1 onto a reception channel V6. The reception channel comprises an amplifier A2. A receiver with synchronous demodulation T2 allows the microwave signal received to be transposed into a video signal. The video signal is digitized by an analog-to-digital converter (ADC) T6. The amplitude and the phase of the digitized signal are stored in a memory T5.

Figure 2:
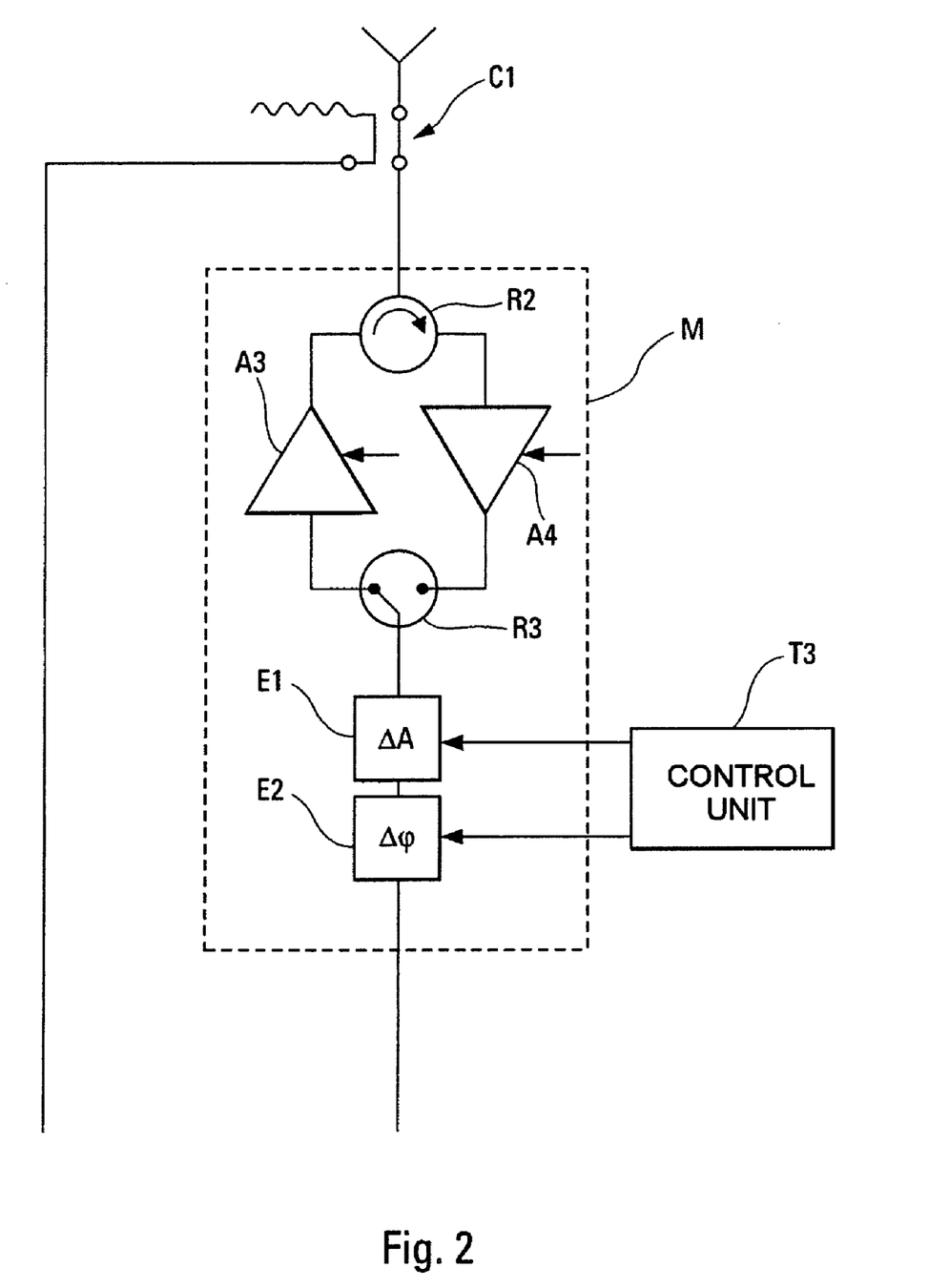
FIG. 2, a source to be calibrated in the radar of the example shown in FIG. 1.

Reference is now made to FIG. 2, in which an example of a source M is shown. The source can be of the modular type. It can be active or passive. The source shown is an active source. The active elements of the source comprise a power amplifier A3, designed to amplify the microwave signal in transmission mode, and a low-noise amplifier A4, designed to amplify the microwave signal in reception mode. The amplifiers A3 and A4 are each on their own channel, the two channels being combined by a circulator R2 on the side of the radiating element, and a two-position selector R3 with three input-outputs on the other side.

The amplifiers A3 and A4 can be controllable. When an amplifier receives the stop command, its power supply turns off. When it receives the start command, the amplifier is powered up. When the stop command is sent to the amplifier A3 and/or A4, the microwave channel of the corresponding amplifier is opened. Thus, the source can be deactivated, in transmission and/or reception mode, by interrupting the power supply of the amplifier A3 and/or A4.

The source M also comprises a controllable phase-shifter E2 that allows the phase of the microwave signals to be modified in transmission or reception mode. The source M can also comprise a controllable attenuator E1. The controllable attenuator allows the amplitude of the microwave signals to be modified in transmission or reception mode. The attenuator E1 and the phase-shifter E2 can be of the programmable-bit type.

With reference to FIG. 1, the radar also comprises an integrated calibration circuit. This circuit comprises a microwave selector K with four input-outputs P1 to P4. A command is sent to the selector K to direct the microwave signal along the desired path between its input-outputs. The selector K is placed in the transmission channel V2, V4 between the amplifier A1 and the circulator R1. The output of the amplifier A1 is connected to the input-output P4. The input of the circulator R1 is connected to the input-output P2. The calibration circuit also comprises two microwave channels V1 and V3. The microwave channel V1 connects the input-output P1 of the selector K to a first microwave coupler C1. The coupler C1 is placed between the radiating element W and the source M. The microwave channel V3 connects the input-output P3 to a second microwave coupler C2. The microwave coupler C2 is placed between the amplifier A2 and the receiver T2. The respective channels V1 and V2 are terminated by matched loads at the respective couplers C1 and C2. The purpose of the load, for example 50 ohm, is to avoid parasitic reflections onto the calibration circuit.

Figure 3:
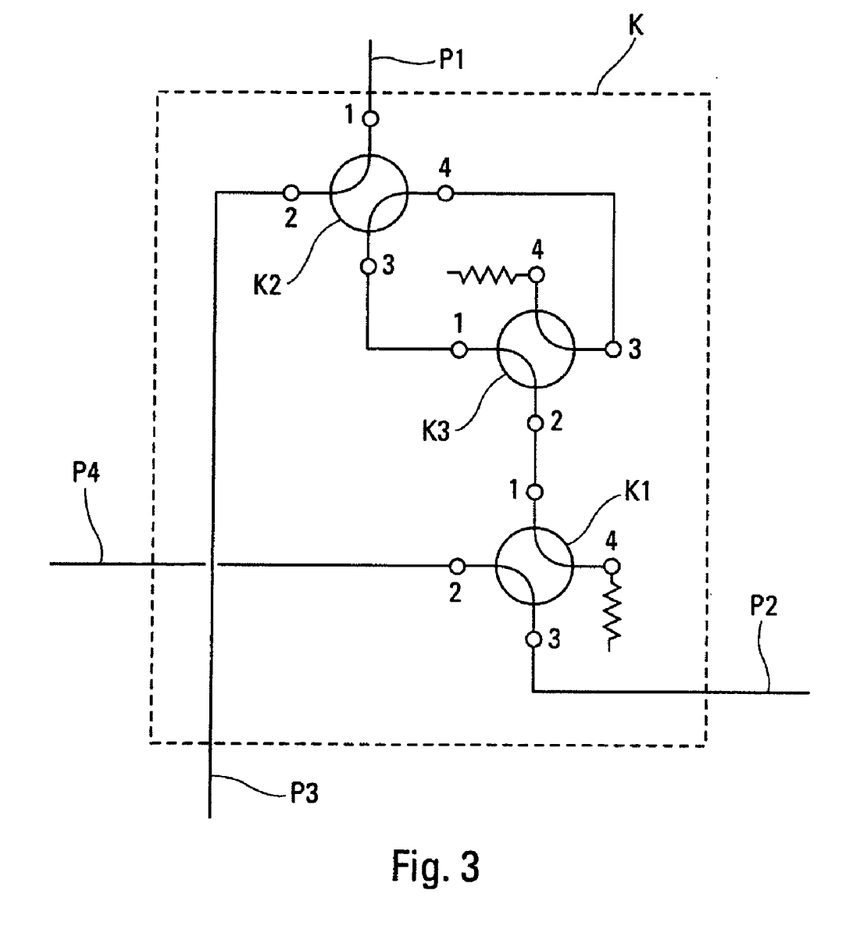
FIG. 3, an example of microwave selector usable in the calibration circuit shown in FIG. 1.

Reference is now made to FIG. 3 in which an examplary embodiment of the selector K is shown. The selector K comprises for example three switches K1, K2, K3. Each switch is a two-position switch, having four input-outputs connected together in pairs, a command (denoted 0 or 1) allowing the configuration of the switch to be changed. A first input-output of the switch K2 forms the input-output P1 of the selector K. A second input-output of the switch K2 forms the input-output P3 of the selector K. A third input-output of the switch K2 is connected to a first input-output of the switch K3. A second input-output of the switch K3 is connected to a first input-output of the switch K1. A third input-output of the switch K3 is connected to the fourth input-output of the switch K2. The fourth input-output of the switch K3 is connected to a load. A second input-output of the switch K1 forms the input-output P4 of the selector K. A third input-output of the switch K1 forms the input-output P2 of the selector K. The fourth input-output of the switch K1 is connected to a load.

Figure 4:
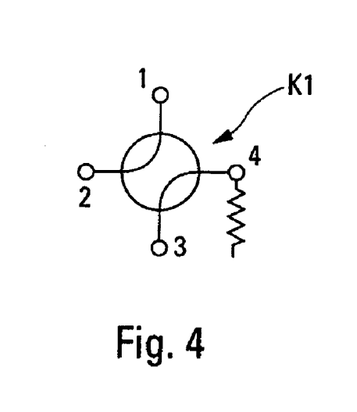
FIGS. 4 and 5, a two-position microwave switch, each figure showing the switch in a different position.

Reference is now made to FIG. 4 in which the switch K1 is shown in a first position, set by a 0 command. In this position, the first input-output is connected to the second; the third input-output is connected to the fourth.

Figure 5:
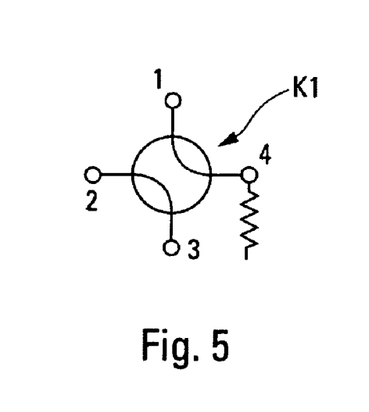

Reference is now made to FIG. 5 in which the switch K1 is shown in the second position (also shown in FIG. 3), set by a 1 command. In this second position, the first input-output is connected to the fourth; the second input-output is connected to the third.

When the switch K2 is in a first position (shown in FIG. 3), set by a 0 command, the first input-output is linked with the second; the third input-output is connected to the fourth. In the second position (not shown), set by a 1 command, the first input-output is connected to the fourth; the second input-output is connected to the third.

When the switch K3 is in a first position (shown in FIG. 3), set by a 0 command, the first input-output is connected to the second; the third input-output is connected to the fourth. In the second position (not shown), set by a 1 command, the first input-output is connected to the fourth; the second input-output is connected to the third.

With reference to FIG. 1, the radar comprises a computation unit T4 functionally connected to the memory T5, on the one hand, and to a control unit T3, on the other. The control unit allows commands to be sent for controlling the sources (phase-shifter, attenuator, amplifiers, selector), the selector (switches K1, K2, K3), and the amplifiers A1 and A2.

The calibration circuit allows the transmission or reception mode to be calibrated. A calibration of the transmission mode is now described. The calibration according to the invention can be performed from at least two measurements, whose order is immaterial.

During a first measurement, henceforth referred to as test measurement, the selector K is configured so as to connect, on the one hand, the input-output P4 with the input-output P2 and, on the other, the input-output P1 with the input-output P3. The switch K1 receives the command 1, the switch K2 receives the command 0, the switch K3 receives the command 0 or 1. The amplifier A3 (see FIG. 2) receives the start command. The amplifier A4 receives the stop command. The generator T1 emits a test signal at a given frequency. This test signal propagates, as when the radar is in transmission mode, through the transmission channel V4, V2, the circulator R1, the transmission-reception channel V5 and the source M. The coupler C1 allows a fraction of this signal to be sampled on the channel V1. The fraction of signal sampled then propagates on the channel V3 as far as the receiver T2 (via the coupler C2). The receiver measures the phase ($\phi_m$ and the amplitude $A_m$ of this signal. This first measurement is stored in the memory T5.

During a second measurement, henceforth referred to as interference measurement, the selector K is configured in the same manner as for the test measurement. However, the calibration circuit is open in the source M. For this purpose, the amplifier A3 receives the stop command. The generator emits the same test signal as during the test measurement. Since the calibration circuit is open, no signal should be received by the receiver. However, a signal originating from leaks or from interference between the various microwave elements propagates as far as the receiver. The receiver T2 measures the phase $\phi_f$ and the amplitude $A_f$ of this interfering (or 'leakage') signal.

Figure 6:
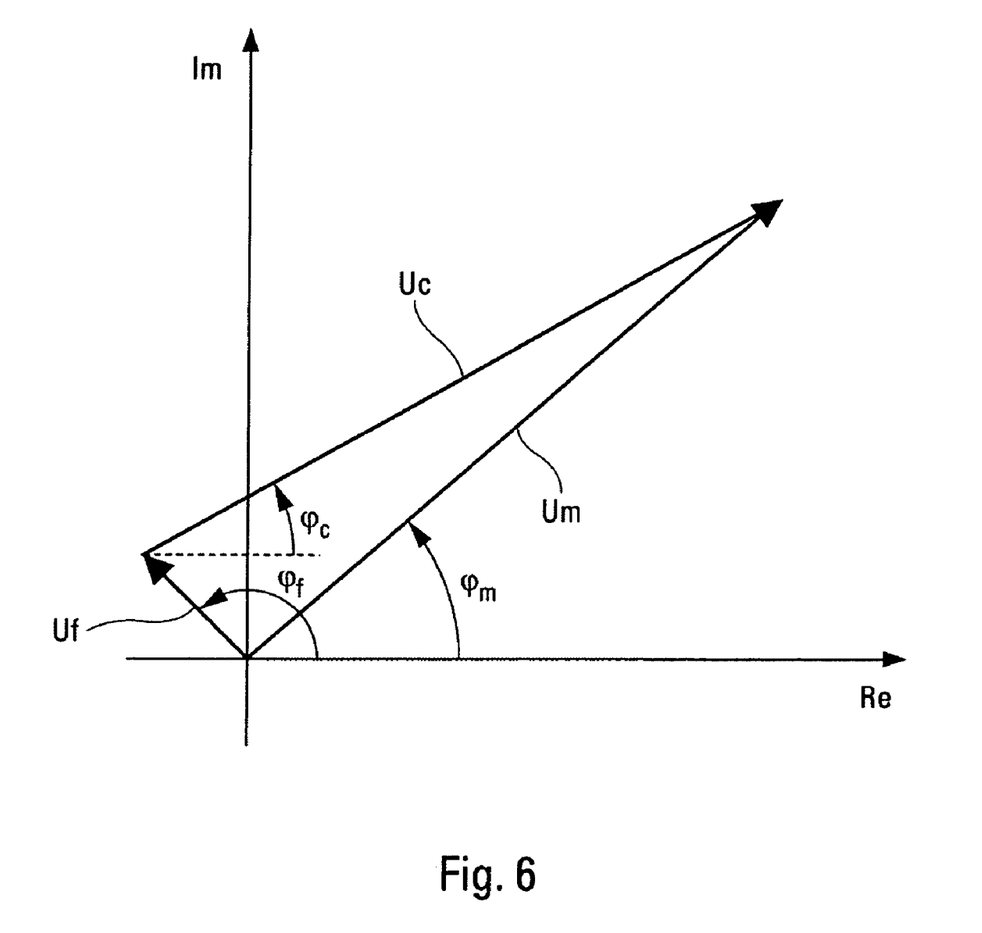
FIG. 6, a geometrical representation of complex numbers involved in the implementation of the invention.

Reference is now made to FIG. 6, which shows a geometrical representation of complex numbers involved in the implementation of the invention. The following complex notations are used:

$$U_m = A_m \cdot \exp(i \cdot \phi_m)$$

$$U_f = A_f \cdot \exp(i \cdot \phi_f)$$

$$i = \sqrt{-1}$$

According to one embodiment of the invention, a complex number $U_c$ is determined, which represents the value that the complex number $U_m$ should have in the absence of interference:

$$U_c = U_m - U_f$$

The complex number $U_c$ can be represented in the complex plane (see FIG. 6) as a difference of two vectors ($U_m$ and $U_f$). The phase $\phi_c$ and the amplitude $A_c$ of $U_c$ can be determined from the following equations:

$$A_c = \sqrt{A_m^2 + A_f^2 - 2 \cdot A_m \cdot A_f \cdot \cos(\varphi_m + \varphi_c)}$$

$\phi_c = A\ TAN\ 2(A_m \cdot \cos(\phi_m) - A_f \cdot \cos(\phi_f); A_m \cdot \sin(\phi_m) - A_f \cdot \sin(\phi_f))$, where A TAN 2(x, y) is a function that returns an angle which is the arctangent of the coordinates x and y, this angle being in the range −180° to 180°, excluding −180°.

The invention allows the errors caused by the interference during the phase calibrations to be corrected, without however requiring the modification of the calibration circuit.

According to one advantageous embodiment, a third measurement, henceforth referred to as reference measurement, is carried out, it being understood that the order in which the measurements are performed is immaterial. The reference measurement is effected by coupling the output of the generator T1 toward the receiver T2. The selector K is configured so that the input-output P4 is linked with the input-output P3. The switch K1 receives the command 0, the switch K2 receives the command 1, the switch K3 receives the command 0. In this manner, the transmission channel V4 (with the amplifier A1) is directly connected to the receiver T2. In this configuration of the selector, the generator T1 emits the same test signal as for the other two measurements (test and interference). The receiver T2 measures the phase $\phi_r$, and, where required, the amplitude $A_r$ of this signal, called reference signal. This additional measurement is stored in the memory T5.

The reference measurement can be carried out during each calibration. It allows the problem of long-term fluctuations (for example over 30 minutes) between two successive calibrations of the source M to be overcome, where these fluctuations can originate from fluctuations in the test signal delivered by the generator T1.

Using the same complex notation, the reference measurement can be represented by a complex number $U_r$:

$U_r = A_r \cdot \exp(i \cdot \phi_r)$

A phase $\phi$ and an amplitude A can be determined that are corrected for the fluctuations in the generator and in the receiver, and also for the interference in the calibration circuit:

$$U = \frac{U_m - U_f}{U_r} = \frac{U_c}{U_r} \text{ with}$$

$$U = A \cdot \exp(i \cdot \varphi)$$

Contrary to the two previous measurements (test and interference), measuring the amplitude $A_r$ is not necessary when it is desired to calibrate only the phase of the source:

$\phi = \phi_c - \phi_r$

Now, a calibration of the reception mode is described. This calibration comprises the same measurements as those performed for the calibration of the transmission mode, but with the selector K configured differently.

During the test measurement, the selector K is configured so as to link the input-output P4 with the input-output P1. The switch K1 receives the command 0, the switch K2 receives the command 1, the switch K3 receives the command 1. The amplifier A4 (see FIG. 2) receives the start command. The generator T1 emits a test signal at a given frequency. This test signal propagates through a portion of the transmission channel V4, the channel V1, then through the coupler C1. The signal then propagates, as when the radar is in reception mode, through the source M, the transmission-reception channel V5, the circulator R1 and the amplifier A2, as far as the receiver T2. The receiver measures the phase $\phi_m$ and the amplitude $A_m$ of this signal. The test measurement is stored in the memory T5.

During interference measurements, the selector K is configured in the same manner as for the test measurement. However, the calibration circuit is open at the source M. For this purpose, the amplifier A4 receives the stop command. In the same way as for the calibration of the transmission mode, the receiver T2 measures the phase $\phi_f$ and the amplitude $A_f$ of the interfering signal.

Subsequently, the same processing is carried out with the test and interference measurements. A reference measurement can also be performed (see above), this measurement being the same whether the transmission or reception mode is being calibrated.

Whether for the calibration of the transmission or reception mode, the calibration circuit is closed, the calibration circuit comprising an injection channel connected to a measurement channel via the source M to be calibrated. For calibrating the transmission mode, the injection channel is formed by the transmission channel V4, V2, V5; and the measurement channel is formed by the channel V1, V3 coupling the source M to the receiver T2. For calibrating the reception mode, the injection channel is formed by the channel V4, V1 bringing the signal to the source M; and the measurement channel is formed by the reception channel V5, V6.

In order to carry out the first measurement, a test signal is injected through the source to be calibrated M, the test signal being injected on the injection channel, the phase $\phi_m$ of the signal having passed through the source to be calibrated is measured, the phase of the signal being measured on the measurement channel, the amplitude $A_m$ of the signal having passed through the source to be calibrated is measured, the amplitude of the signal being measured on the measurement channel.

In order to carry out the second measurement, the calibration circuit is opened at the source to be calibrated. In this example, the circuit is opened during a calibration of the transmission or reception mode, respectively, by turning off the power to the respective amplifier A3 or A4 (with a stop command). The test signal is injected on the injection channel, the phase $\phi_f$ and the amplitude $A_f$ of the signal present on the measurement channel is measured.

With these two measurements, whose order is immaterial, value of the corrected phase $\phi_c$ is determined, this corrected phase being the phase of the complex number $U_c$.

Figure 7:
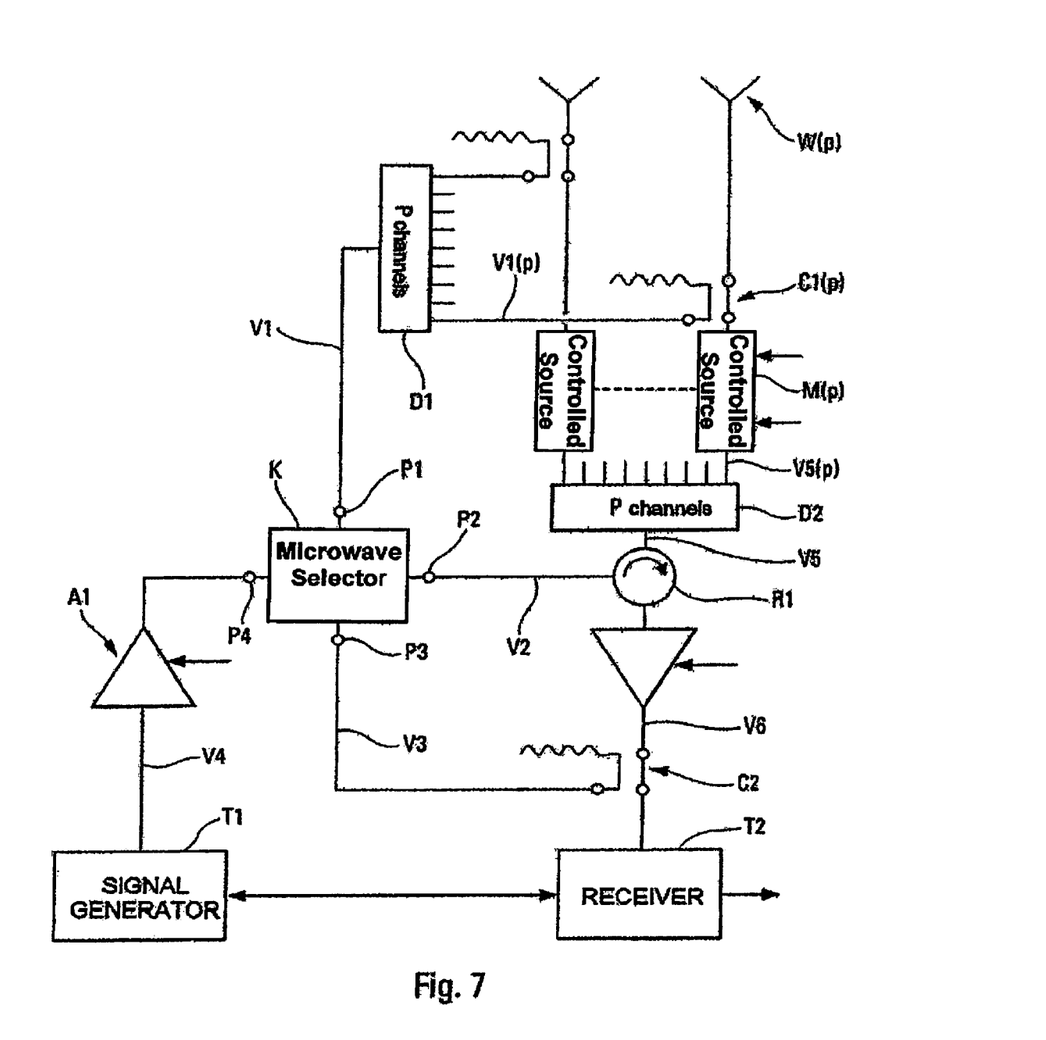
FIG. 7, an example of array antenna, where the radar is equipped with a calibration circuit.

Reference is now made to FIG. 7 in which an example of array antenna equipped with a calibration circuit is shown. The calibration circuit shown in FIG. 1 is modified by adding an array of sources M and of radiating elements W. An index p, varying from 1 to P, is used to differentiate the elements (sources, radiating elements) of the array.

Two passive microwave distributors D1, D2 are respectively added onto the channels V1 and V5. These distributors allow a microwave channel to be separated into P subchannels, the power of the signal being divided by P on each of these sub-channels.

The distributor D2 separates the channel V5 into P transmission and reception sub-channels V5(p). Each transmission and reception sub-channel V5(p) comprises a radiating element W(p) and a source M(p). All the sub-channels V5(p) come together at the distributor D2 to form the channel V5, that is connected to the circulator R1.

The distributor D1 separates the channel V1 into P sub-channels V1(p). A coupler C1(p) terminates each sub-channel V1(p). Consequently, the input-output P1 of the selector K is connected to P couplers C1(p).

The calibrations are effected for each element of the array. Consequently, for a given frequency, P calibrations of the emission mode and P calibrations of the reception mode are carried out.

For a given index p, the calibration of the reception or transmission mode of the source M(p) comprises the same steps as those described hereinabove, the only difference being that the other sources M(k) with k different from p are deactivated. In order to deactivate a source M(k), the power supply to the amplifiers A3(k) and A4(k) is interrupted.

Consequently, the interference measurement (phase $\phi_f$ and amplitude $A_f$) is the same for all the indices p. The same measurement can thus be used when p varies. In complex notation, the interference correction operation can be expressed as:

$$U_c(p) = U_m(p) - U_f$$

In an array antenna such as that shown in FIG. 7, the interference has a relative level that is non-negligible with respect to the signal. Indeed, the distributors D1, D2 cause significant losses, if only for the fact that the power is divided by P. It is therefore necessary to transmit a high-power signal. Moreover, in order to limit the overall size, the various elements (such as the passive distributors) are located close together, which induces parasitic coupling. Consequently, the transmitted (high power) signal may, by electromagnetic coupling, be found on the reception channel. The invention allows this interference problem to be overcome.

Some sources of an array antenna may fail. It can notably happen that one of the sources M(k) does not respond to the deactivation commands. In other words, the power supply of the amplifier A3(k) or A4(k) does not turn off despite a command to this effect.

In conventional calibration methods, it is then no longer possible to perform the calibration. Indeed, since the deactivation of the source M(k) is impossible, the sum of the signals of the sources M(k) and M(p) is obtained when the calibration of the source M(p) is carried out. The method according to the invention allows this problem to be solved. Indeed, the signal coming from the source M(k) is found both in the term $U_m$ and in the term $U_f$. It can therefore be eliminated by taking the difference of the two terms.

According to one advantageous embodiment, the amplitude $A_c$ is measured, and this amplitude is compared with a given threshold in order to detect failures. When the amplitude $A_c$ is below the threshold, the failure is detected. In this way, the deactivation failures that the amplification failures (failure resulting in an abnormal drop in the power of the source) are detected.

The invention allows the position of the defective sources (deactivation failure or amplification failure) to be localized even if several sources of the array are simultaneously defective.

When a calibration of an array antenna is performed, it is desirable to reduce the calibration time as far as possible in order to avoid mobilizing the radar for too long a time. For this purpose, the same interference measurement can be used for several calibrations, as described hereinabove. However, fluctuations in the receiver or in the generator can lead to a degradation in the efficacy of the calibration.

According to one advantageous embodiment, a corrective term a is added to the interference measurement, this corrective term being a complex coefficient correcting the fluctuations over time between the interference measurement and the test measurement.

The previous equation becomes:

$$U_c(p) = U_m(p) - \alpha \cdot U_f$$

The term $\alpha$ may be determined by taking the ratio between two reference measurements, a first reference measurement being concomitant with the test measurement and the other reference measurement being concomitant with the interference measurement. Measurements are deemed to be concomitant if they are both acquired within a short enough period of time such that the fluctuations over time become negligible. Accordingly, the fluctuations in the interference measurement can be corrected.

For example, for a given frequency, a reference measurement followed by a calibration measurement can be carried out at a time $t_0$. These measurements are denoted $U_r(t_0)$ and $U_f(t_0)$. A test measurement and a reference measurement is then performed for each value of p, these measurements being performed at a time $t_p$. The phase and/or the amplitude of the number $U_c(p)$ are then determined, which number is defined by the following equation:

$$U_c(p) = U_m(p) - \alpha(t_p) \cdot U_f(t_0) \text{ with}$$

$$\alpha(t_p) = \frac{U_r(t_p)}{U_r(t_0)}$$

The phase and/or the amplitude of $U_c(p)$, in other words the amplitude and the phase corrected for interference, are determined by the following equations:

$$A_c(p) = \sqrt{A_m^2(p) + A_f'^2(t_p) - 2 \cdot A_m^2(p) \cdot A_f'^2(t_p) \cdot \cos(\varphi_m(p) + \varphi_f'(p))}$$

$$\varphi_c(p) = \text{ATAN2}(\text{Re}(U_c(p)); \text{Im}(U_c(p))) \text{ with}$$

$$\text{Re}(U_c(p)) = A_m(p) \cdot \cos(\varphi_m(p)) - A_f'(t_p) \cdot \cos(\varphi_f'(t_p))$$

$$\text{Im}(U_c(p)) = A_m(p) \cdot \sin(\varphi_m(p)) - A_f'(t_p) \cdot \sin(\varphi_f'(t_p))$$

$$A_f'(t_p) = \frac{A_r(t_p)}{A_r(t_0)} A_f(t_0)$$

$$\varphi_f'(t_p) = \varphi_f(t_0) + \varphi_r(t_p) - \varphi_r(t_0)$$

Of course, several test measurements can be carried out for one reference measurement. For example, one reference measurement can be performed for every five test measurements, where the total number of test measurements can be of the order of 1000.

Advantageously, the long-term fluctuations over time are also corrected for, as described above:

$$U(p) = \frac{U_c(p)}{U_r(t_p)}$$

This correction allows the problem of fluctuations between the calibrations of the two sources to be overcome, if there is a significant lapse of time separating these two calibrations. This is especially the case for array antennas comprising a large number of elements, for which the calibration of all the elements lasts for a time that is long enough for the fluctuations to be perceptible.

Figure 8:
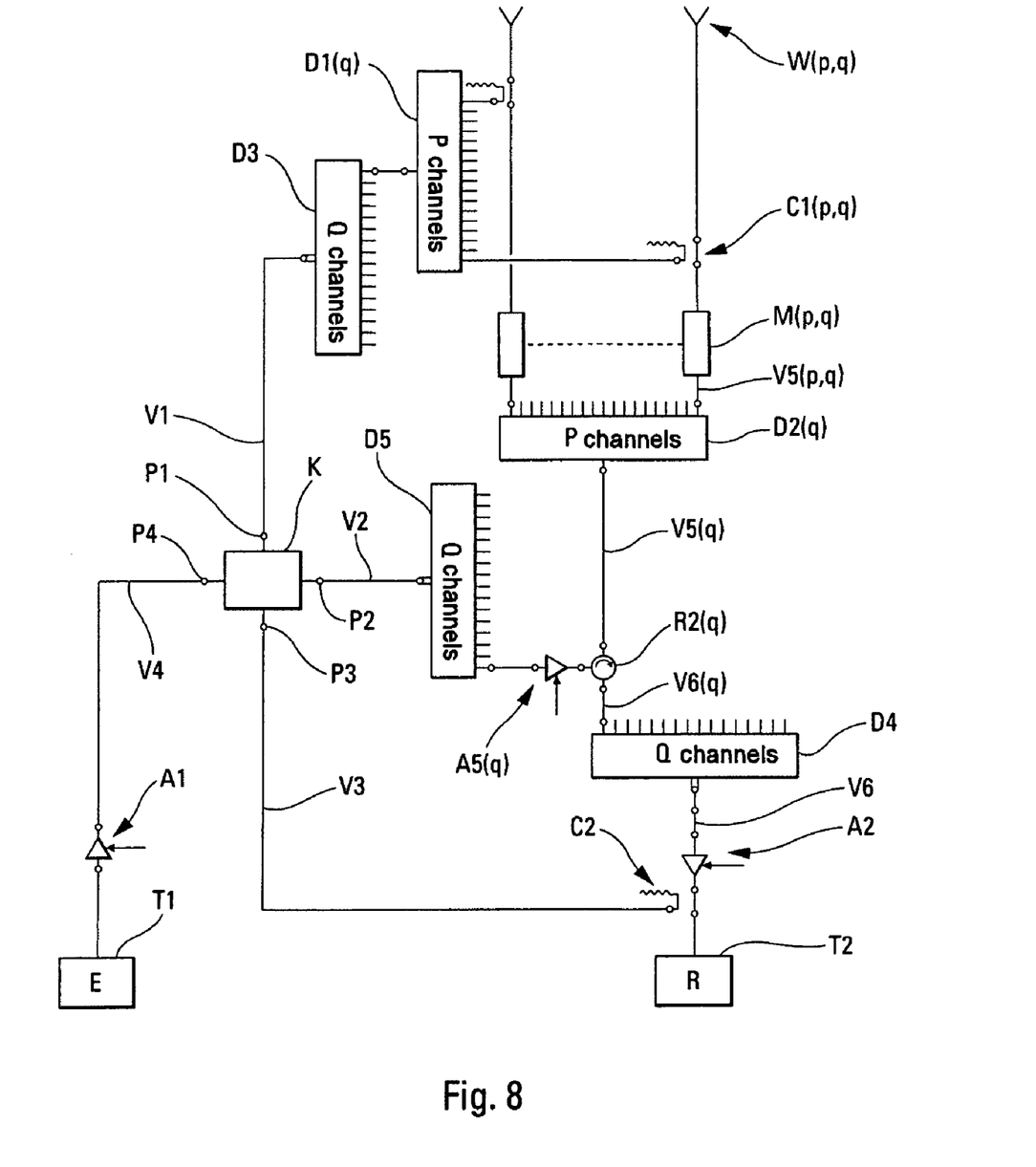
FIG. 8, an example of array antenna configured with two passive distributor stages, where the radar is equipped with a calibration circuit.

Reference is now made to FIG. 8 in which an example of array antenna configured with two passive distributor stages is shown, where the radar is equipped with a calibration circuit. This radar comprises elements that are common with the radar systems shown in FIGS. 1 and 7.

Starting from the signal generator T1, the radar transmission channel comprises:

the transmission channel V4 in which the amplifier A1 is placed, the transmission channel V4 being connected to the input-output P4 of the selector K;

the transmission channel V2 in which a first passive distributor D5 is placed, the transmission channel V2 being connected to the input-output P2 of the selector K, the passive distributor dividing the transmission channel V2 into Q sub-channels, denoted V2($q$);

amplifiers A5($q$), an amplifier A5($q$) being placed in each sub-channel V2($q$);

transmission and reception sub-channels V5($q$), there being a number Q of these sub-channels, each sub-channel V5($q$) being connected to a sub-channel V2($q$) by a circulator R2($q$);

passive distributors D2($q$), each passive distributor being placed in a sub-channel V5($q$) that it divides into P other sub-channels V5($p,q$);

sources M(p,q) and radiating elements W(p,q) placed in each sub-channel V5($p,q$).

With respect to the previous architecture, the amplifiers A5 have been added. These provide compensation for the losses at the output of the passive distributor D5, which compensation improves the performance of the radar.

The radar reception channel comprises:
the radiating elements W(p,q) and the sources M(p,q);
the passive distributors D2($q$);
the circulators R2($q$);
reception sub-channels V6($q$), each sub-channel being connected to a circulator R2($q$);
a distributor D4, combining the Q sub-channels V6($q$) to form the reception channel V6;
the amplifier A2, placed in the channel V6;
the receiver T2 with synchronous demodulation.

The channel V3 of the calibration circuit is unchanged. It is coupled via the coupler C2 to the channel V6 between the amplifier A2 and the receiver T2.

The channel V1 of the calibration circuit is divided into Q sub-channels by a first passive distributor D3, each sub-channel being in turn divided into P other sub-channels by a passive distributor D1($q$), these PxQ sub-channels being coupled by couplers C1($p,q$). Each coupler C1($p,q$) is placed between the radiating element W(p,q) and the source M(p, q).

An example is now described of the commands applied during the various measurements involved in a calibration of a source M(p,q).

In order to perform the test measurement during a calibration of the reception mode of the source M(p,q), the switch K1 receives the command 0, the switch K2 receives the command 1, the switch K3 receives the command 1, the amplifier A1 receives the start command, the amplifiers A5($k$) receive the stop command, the amplifier A2 receives the start command, the amplifier A4($p,q$) receives the start command and the other amplifiers A4($k,l$) receive the stop command, the amplifier A3($k,l$) receive the stop command.

In order to perform the interference measurement during a calibration of the reception mode of the source M(p,q), the amplifiers A4($k,l$) all receive the stop command. The other commands remain the same as for the test measurement. Consequently, the same commands are applied whichever source M(p,q) is being considered.

In order to carry out the test measurement during a calibration of the transmission mode of the source M(p,q), the switch K1 receives the command 1, the switch K2 receives the command 0, the switch K3 receives the command 0 or 1, the amplifier A1 receives the start command, the amplifier A5($q$) receives the start command and the other amplifiers A5($k$) receive the stop command, the amplifier A2 receives the stop command, the amplifiers A3($p,q$) receives the start command and the other amplifiers A3($k,l$) receive the stop command, the amplifiers A4($k,l$) receive the stop command.

In order to carry out the interference measurement during a calibration of the transmission mode of the source M(p,q), the amplifiers A3($k,l$) all receive the stop command. The other commands remain the same as for the test measurement. Consequently, different commands are applied when the index q changes. It is therefore necessary to carry out a minimum of Q interference measurements for the calibration of the transmission of the sources M(p,q).

In order to perform the reference measurement, whether during a transmission or reception calibration, whichever source M(p,q) is being considered, the switch K1 receives the command 0, the switch K2 receives the command 1, the switch K3 receives the command 0, the amplifier A1 receives the start command, the amplifiers A5($k$) receive the stop command, the amplifier A3 receives the stop command, the amplifiers A3($k,l$) and A4($k,l$) of the sources M(k,l) receive the stop command.

According to another embodiment, the passive distributors are replaced by microwave selectors.

In order to select a source to be calibrated (when the calibration circuit is closed), the test signal can thus be directed toward this source by controlling the selectors accordingly, instead of sending a stop command to the other sources.

In order to open the calibration circuit (interference measurement), the microwave signal can thus be directed toward a load, instead of sending a stop command to the other sources.

The invention is not of course limited to these exemplary embodiments. The architecture of the radar and/or of the calibration circuit may be different. The calibration circuit can be external to the radar. The number of distributors/ selectors can be different. The calibration can be carried out at several frequencies and temperatures.

What is claimed is:

1. A method of calibrating the phase of a microwave source, said method comprising:

a) a first step during which a calibration is closed, the calibration circuit comprising an injection channel connected to a measurement channel via microwave through the source to be calibrated said first step including:

injecting test signal through the source to be calibrated, the test signal being injected on the injection channel, measuring the phase $\phi_m$ of the signal having passed through the source to be calibrated, the phase of the signal being measured on the measurement channel, measuring the amplitude $A_m$ of the signal having passed through the source to be calibrated, the amplitude of the signal being measured on the measurement channel;

b) a second step during which the calibration circuit is opened at the source to be calibrated is used to perform a relative measurement $U_f$ of the microwave interference signal coming from the imperfect electromagnetic isolation of the calibration circuit and not coming from outside said second step including:

injecting the test signal on the injection channel;

measuring the phase $\phi_f$ and the amplitude $A_f$ of the signal present on the measurement channel; and c) a third step during which a corrected phase value $\phi_c$ is determined, this corrected phase being the phase of a complex number $U_c$, calculated from two complex numbers $U_m$ and $U_f$, where:

$$U_m = A_m \cdot \exp(i \cdot \phi_m)$$

$$U_f = A_f \exp(i \cdot \phi_f).$$

2. The method as claimed in claim 1, in which the complex number $U_c$ is given by the following equation:

$$U_c = U_m - \alpha \cdot U_f$$

where $\alpha$ is a complex coefficient correcting for the fluctuations over time in $\phi_f$ and $A_f$ between the measurements of ($\phi_m$ and $A_m$, on the one hand, and of $\phi_f$ and $A_f$, on the other, this coefficient being equal to 1 in the absence of the correction.

3. The method as claimed in claim 1, in which a value of the corrected amplitude $A_c$ is determined, this corrected amplitude being the amplitude of the complex number $U_c$.

4. The method as claimed in claim 2, in which the complex coefficient $\alpha$ is given by the following equation:

$$\alpha = \frac{U_r(t_1)}{U_r(t_0)}$$

where $U_r$ represents a measurement of the phase and of the amplitude of a reference signal, the measurement $U_r(t_1)$ being concomitant with the measurement of $U_m$, and the measurement $U_r(t_0)$ being concomitant with the measurement of $U_f$.

5. The method as claimed in claim 2, in which a value of the corrected amplitude $A_c$ is determined, this corrected amplitude being the amplitude of the complex number $U_c$.

6. The method as claimed in claim 5, in which the complex coefficient $\alpha$ is given by the following equation:

$$\alpha = \frac{U_r(t_1)}{U_r(t_0)}$$

where $U_r$ represents a measurement of the phase and of the amplitude of a reference signal, the measurement $U_r(t_1)$ being concomitant with the measurement of $U_m$, and the measurement $U_r(t_0)$ being concomitant with the measurement of $U_f$.

7. The method as claimed in claim 4, in which a value of the corrected amplitude $A_c$ is determined, this corrected amplitude being the amplitude of the complex number $U_c$.

8. The method as claimed in claim 1, wherein the calibration circuit is used to increase the phase and amplitude of the signal $U_m$ through the source to be calibrated.

* * * * *